United States Patent [19]

Okumura et al.

[11] 4,446,262

[45] May 1, 1984

[54] PROTECTION FROM ULTRAVIOLET LIGHT BY USE OF NOVEL ULTRAVIOLET ABSORBER

[75] Inventors: Nobuya Okumura, Ehime; Tetsuo Ichihashi, Matsuyama; Shunichi Matsumura; Hiroo Inata, both of Iwakuni, all of Japan

[73] Assignee: Teijin Limited, Osaka, Japan

[21] Appl. No.: 389,117

[22] Filed: Jun. 16, 1982

[30] Foreign Application Priority Data

Jun. 19, 1981 [JP] Japan .................................. 56-93722

[51] Int. Cl.³ ................................................ C08K 5/35
[52] U.S. Cl. ........................................ 524/89; 524/87; 524/90
[58] Field of Search ...................... 524/87, 89, 90, 105

[56] References Cited

U.S. PATENT DOCUMENTS

| | | | |
|---|---|---|---|
| 3,325,445 | 6/1967 | Harris et al. | 524/105 |
| 3,497,512 | 2/1970 | Hofer et al. | 524/89 |
| 3,644,345 | 2/1972 | Siegrist et al. | 524/89 |
| 3,971,757 | 7/1976 | Rasberger | 524/105 |
| 4,291,152 | 9/1981 | Inata et al. | 528/289 |

*Primary Examiner*—John Kight, III
*Assistant Examiner*—R. A. White
*Attorney, Agent, or Firm*—Sherman & Shalloway

[57] ABSTRACT

A photo-stabilized polymer composition comprising a polymer and as an ultraviolet absorber, at least one compound selected from specific cyclic imino esters having an aromatic nucleus, two carbon atoms of which forms a part of the imino ester ring, such as 2,2'-p-phenylene-bis(3,1-benzoxazin-4-one), or 2,8-dimethyl-4H,6H-benzo[1,2-d:5,4-d']bis-[1,3]-oxazine-4,6-dione, in the unreacted state. The ultraviolet absorber has excellent stability to heat and oxidation, and is useful, for example, for protecting from ultraviolet light a molded article of a polymer whose deterioration by ultraviolet light is required to be retarded or prevented or for protecting from ultraviolet light an object subject to deleterious effects under ultraviolet light.

28 Claims, No Drawings

PROTECTION FROM ULTRAVIOLET LIGHT BY USE OF NOVEL ULTRAVIOLET ABSORBER

This invention relates to protection from ultraviolet light by the use of a novel ultraviolet absorber. More specifically, it pertains to a photo-stabilized polymer composition comprising a cyclic imino ester as a novel ultraviolet absorber, and a method for protecting an object vulnerable to deleterious effects under ultraviolet light by using the cyclic imino ester as an ultraviolet absorber.

Organic materials, such as synthetic resins, natural resins, rubbers, oil-base paints, inks and dyes, are generally sensitive to ultraviolet light. Many of these materials undergo deterioration and decomposition under its action, and change in color, mechanical strength, etc. Hence, they cannot withstand long-term use. It was recently found, on the other hand, that there is a close correlation between ultraviolet light and the growth of certain kinds of pathogenic fungi on plants, for example fungi causing blast and Helminthosporium leaf spot rice, fungi causing sclerotinea seed rot to various vegetables such as fruit, leaf and root crops, and other fungi causing gray mold, anthracnose, gummy stem blight, black mold and leaf spot to plants, and these fungi do not grow under complete shielding of ultraviolet light having a specified wavelength.

It is the usual practice therefore to include ultraviolet absorbers into organic materials intended for outdoor use such as various plastic articles, or transparent organic or inorganic materials used in applications which require shielding of ultraviolet light.

Benzophenone compounds, benzotriazole compounds, salicyclic acid compounds and hydroquinone compounds are known and widely used as such ultraviolet absorbers. Many of them, however, do not have entirely satisfactory stability against heat or oxidation. Or many of them have the defect that they sublime at high temperatures of, for example, more than 200° C., or bleed out into the surface of the materials during use.

It is an object of this invention therefore to provide a novel ultraviolet absorber which has quite a different structure from the hitherto known ultraviolet absorbers.

Another object of this invention is to provide a novel ultraviolet absorber having excellent stability to heat or oxidation.

Still another object of this invention is to provide a novel ultraviolet absorber which has sufficiently reduced sublimability at high temperatures of, for example, more than 200° C. and excellent compatibility with various polymers.

Still another object of this invention is to provide a novel ultraviolet absorber having excellent heat resistance and compatibility and reduced sublimability, which can be surely melt-mixed with various polymers having high melting points at high temperatures at which they are molten, and therefore can be uniformly dispersed in a fixed amount in polymers having high melting points.

Still another object of this invention is to provide a novel ultraviolet absorber which has excellent compatibility with polymers such that its bleed-out in use from a polymer containing it does not substantially present any problem.

Still another object of this invention is to provide a specified cyclic imino ester compound as the aforesaid novel ultraviolet absorber.

Still another object of this invention is to provide a photo-stabilized polymer composition comprising a specified cyclic imino ester as an ultraviolet absorber.

Still another object of this invention is to provide a method for protecting a polymeric article from deterioration by ultraviolet light by applying a specified imino ester thereto.

Still another object of this invention is to provide a method for isolating from ultraviolet light an object required to be protected from ultraviolet light by a polymer article to which a specified cyclic imino ester has been applied.

Further objects and advantages of this invention will become apparent from the following description.

Firstly, these objects and advantages of this invention are achieved in accordance with this invention by a photo-stabilized polymer composition comprising a polymer and as an ultraviolet absorber, at least one compound selected from cyclic imino esters of the following formula (I)

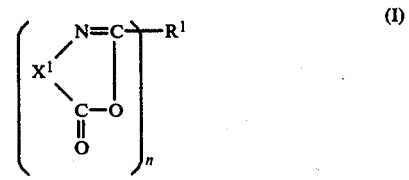

wherein $X^1$ represents a divalent aromatic residue in which the two bonds from $X^1$ are at the 1- and 2-positions; n is 1, 2 or 3; and $R^1$ represents a hydrocarbon residue having a valence of n which may further contain a hetero atom, or $R^1$ may be a direct bond when n is 2, and cyclic imino esters of the following formula (II)

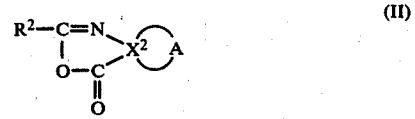

wherein A represents a group of the following formula (II)-a

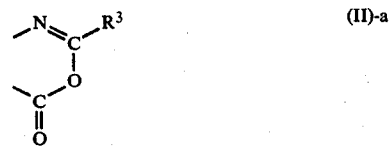

or a group of the following formula (II)-b

$R^2$ and $R^3$ are identical or different and each represents a monovalent hydrocarbon residue; and $X^2$ represents a tetravalent aromatic residue which may further contain a hetero atom, in the unreacted state.

Many of the cyclic imino esters of formulae (I) and (II) are known as molecular chain bonding agents for hydroxyl-terminated aromatic polyesters (U.S. Pat. No. 4,291,152). Some compounds of formula (I) in which $R^1$ is phenyl or substituted phenyl, $X^1$ is o-phenylene and n is 1, and a synthesizing method therefor are known (for example, Chemical Abstracts, Vol. 65, 1966, 15371d).

Accordingly, these documents are cited herein as references in regard to the compounds of formulae (I) and (II) used in this invention and synthesizing methods therefor.

In general formula (I), $X^1$ is a divalent aromatic residue in which two bonds from $X^1$ are at the 1- and 2-positions; n is 1, 2 or 3; and $R^1$ is a hydrocarbon residue having a valence of n which may further contain a hetero atom. Or $R^1$ may be a direct bond when n is 2.

Preferred examples of $X^1$ include 1,2-phenylene, 1,2-naphthylene, 2,3-naphthylene, and groups represented by the following formula

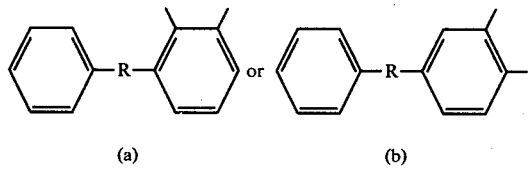

(a)    (b)

wherein R is —O—, —CO—, —S—, —SO$_2$—, —CH$_2$—, —CH$_2$—$_2$ or —C(CH$_3$)$_2$—.

Of these, 1,2-phenylene is especially preferred.

The aromatic residue for $X^1$ exemplified above may be substituted by substituents, for example alkyl groups having 1 to 10 carbon atoms such as methyl, ethyl, propyl, hexyl and decyl; aryl groups having 6 to 12 carbon atoms such as phenyl and naphthyl; cycloalkyl groups having 5 to 12 carbon atoms such as cyclopentyl and cyclohexyl; aralkyl groups having 8 to 20 carbon atoms such as phenethyl; alkoxy groups having 1 to 10 carbon atoms such as methoxy, ethoxy and decyloxy; nitro; halogens such as chlorine and bromine; and acyl groups having 2 to 10 carbon atoms such as acetyl, propionyl, benzoyl and decanoyl.

$R^1$ is a hydrocarbon residue having a valence of n (n=1, 2 or 3), and only when n is 2, it may be a direct bond.

The monovalent hydrocarbon residue (n=1) may firstly include unsubstituted aliphatic groups having 1 to 10 carbon atoms, unsubstituted aromatic groups having 6 to 12 carbon atoms, and unsubstituted alicyclic groups having 5 to 12 carbon atoms.

Examples of the unsubstituted aliphatic groups having 1 to 10 carbon atoms are methyl, ethyl, propyl, butyl and decyl. Examples of the unsubstituted aromatic groups having 6 to 12 carbon atoms are phenyl, naphthyl and biphenyl, and examples of the unsubstituted alicyclic groups having 5 to 12 carbon atoms are cyclopentyl and cyclohexyl.

Secondly, the monovalent hydrocarbon residue includes, for example, groups of the following formula (c)

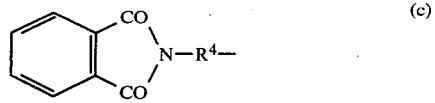

wherein $R^4$ represents alkylene of 2 to 10 carbon atoms, phenylene or naphthylene, groups of the following formula (d)

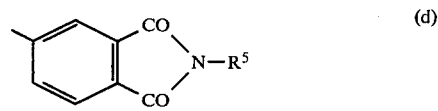

wherein $R^5$ represents an alkyl group having 1 to 10 carbon atoms, a phenyl group or a naphthyl group, groups of the following formula (e)

wherein $R^4$ and $R^5$ are as defined, and $R^6$ is a hydrogen atom or any of the groups defined for $R^5$, and substituted aliphatic residues or aromatic residues of the following formula (f)

wherein $R^4$ and $R^6$ are as defined, and $R^7$ is a hydrogen atom or any one of the groups defined for $R^5$.

Thirdly, examples of the monovalent hydrocarbon residue are substitution products of the above-mentioned unsubstituted aromatic residues, which have the same substituents as exemplified hereinbelow for the aromatic residue $X^1$. Therefore, such substituted aromatic residues, include, for example, tolyl, methylnaphthyl, nitrophenyl, nitronaphthyl, chlorophenyl, benzoylphenyl, acetylphenyl and acetylnaphthyl.

The substituted aliphatic or aromatic groups represented by formulae (c), (d), (e) and (f), above all the substituted aromatic residues, are preferred as the monovalent hydrocarbon residue.

The divalent hydrocarbon residue (n=2) firstly includes, for example, unsubstituted aliphatic residues having 2 to 10 carbon atoms, unsubstituted aromatic residues having 6 to 12 carbon atoms, and unsubstituted alicyclic residues having 5 to 12 carbon atoms. Examples of the unsubstituted aliphatic residues having 2 to 10 carbon atoms are ethylene, trimethylene, tetramethylene and decamethylene. Examples of the unsubstituted aromatic residues having 6 to 12 carbon atoms are phenylene, naphthylene and p,p'-biphenylene. Examples of the unsubstituted alicyclic residues having 5 to 12 carbon atoms include cyclopentylene and cyclohexylene.

Secondly, examples of the divalent hydrocarbon residue include groups represented by the following formula (g)

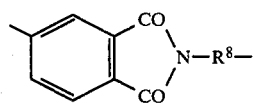

(g)

wherein R⁸ is any one of the groups defined for R⁴, and substituted aliphatic or aromatic residues of the following formula (h)

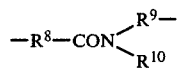

(h)

wherein R⁸ is as defined, R⁹ is any one of the groups defined for R⁴, and R¹⁰ is any one of the groups defined for R⁶.

Thirdly, examples of the divalent hydrocarbon residue include substitution products of the above-mentioned unsubstituted divalent aromatic residues, which have the same substituents as exemplified hereinabove for the aromatic groups X¹.

When n is 2, R¹ is preferably a direct bond or any one of the unsubstituted or substituted aromatic hydrocarbon residues in the first to third groups. Those unsubstituted or substituted aromatic hydrocarbon residues in the first or third group in which the two bonds extend from positions farthest from each other, above all p-phenylene, p,p'-biphenylene, and 2,6-naphthylene, are especially preferred.

Aromatic residues having 6 to 12 carbon atoms may be cited as examples of the trivalent hydrocarbon residue (n=3). Specific examples are:

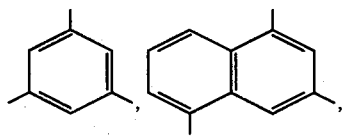

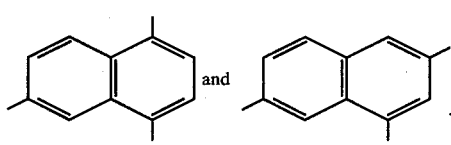 and

These aromatic residues may be substituted by the same substituents exemplified hereinabove for the monovalent aromatic residues.

In general formula (II), R² and R³ are identical or different and each represents a monovalent hydrocarbon residue and X² is a tetravalent aromatic hydrocarbon residue.

Examples of R² and R³ are the same groups as exemplified hereinabove for R¹ with n=1.

Examples of the tetravalent aromatic hydrocarbon residue X² are

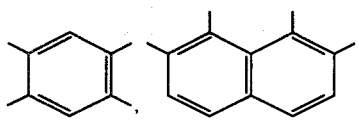

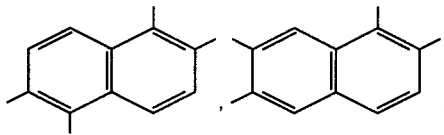

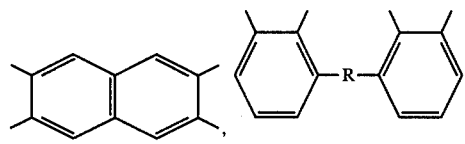

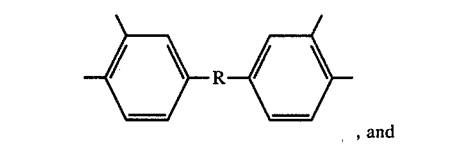, and

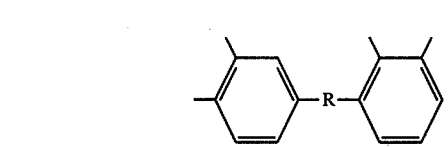

In these formulae, R is as defined with respect to formula (a) above.

The tetravalent aromatic hydrocarbon residue may be substituted by the same substituents exemplified hereinabove for the monovalent aromatic residue.

Specific examples of the cyclic imino esters of formula (I) or (II) used in this invention are as follows:

1. COMPOUNDS OF FORMULA (I)

Compounds wherein n is 1
2-Methyl-3,1-benzoxazin-4-one,
2-butyl-3,1-benzoxazin-4-one,
2-phenyl-3,1-benzoxazin-4-one,
2-(1- or 2-naphthyl)-3,1-benzoxazin-4-one,
2-(4-biphenyl)-3,1-benzoxazin-4-one,
2-p-nitrophenyl-3,1-benzoxazin-4-one,
2-m-nitrophenyl-3,1-benzoxazin-4-one,
2-p-benzoylphenyl-3,1-benzoxazin-4-one,
2-p-methoxyphenyl-3,1-benzoxazin-4-one,
2-O-methoxyphenyl-3,1-benzoxazin-4-one,
2-cyclohexyl-3,1-benzoxazin-4-one,
2-p-(or m-)phthalimidephenyl-3,1-benzoxazin-4-one,
N-phenyl-4-(3,1-benzoxazin-4-one-2-yl)phthalimide,
N-benzoyl-4-(3,1-benzoxazine-4-one-2-yl)aniline,
N-benzoyl-N-methyl-4-(3,1-benzoxazin-4-one-2-yl)-aniline,
2-[p-(N-phenylcarbamonyl)phenyl]-3,1-benzoxazin-4-one, and
2-[p-(N-phenyl N-methylcarbamoyl)phenyl]-3,1-benzoxazin-4-one.

Compounds wherein n is 2
2,2'-bis(3,1-benzoxazin-4-one),
2,2'-ethylenebis(3,1-benzoxazin-4-one),
2,2'-tetramethylenebis(3,1-benzoxazin-4-one),
2,2'-hexamethylenebis(3,1-benzoxazin-4-one),
2,2'-decamethylenebis(3,1-benzoxazin-4-one),
2,2'-p-phenylenebis(3,1-benzoxazin-4-one),
2,2'-m-phenylenebis(3,1-benzoxazin-4-one),
2,2'-(4,4'-diphenylene)bis(3,1-benzoxazin-4-one),
2,2'-(2,6-or 1,5-naphthalene)bis(3,1-benzoxazin-4-one),
2,2'-(2-methyl-p-phenylene)bis(3,1-benzoxazin-4-one), 2,2'-(2-nitro-p-phenylene)bis(3,1-benzoxazin-4-one),
2,2'-(2-chloro-p-phenylene)bis(3,1-benzoxazin-4-one),
2,2'-(1,4-cyclohexylene)bis(3,1-benzoxazin-4-one),
N-p-(3,1-benzoxazin-4-on-2-yl)phenyl, 4-(3,1-benzoxazin-4-on-2-yl)phthalimide, and
N-p-(3,1-benzoxazin-4-on-2-yl)benzoyl, 4-(3,1-benzoxazin-4-on-2-yl)aniline.

Compounds wherein n is 3
1,3,5-Tri(3,1-benzoxazin-4-on-2-yl)benzene,
1,3,5-tri(3,1-benzoxazin-4-on-2-yl)naphthalene, and
2,4,6-tri(3,1-benzoxazin-4-on-2-yl)naphthalene.

COMPOUNDS OF FORMULA (II)

2,8-Dimethyl-4H,6H-benzo[1,2-d:5,4-d']bis[1,3]-oxazine-4,6-dione,
2,7-dimethyl-4H,9H-benzo[1,2-d:4.5-d']bis[1,3]-oxazine-4,9-dione,
2,8-diphenyl-4H,6H-benzo[1,2-d:5,4-d']bis-[1,3]-oxazine-4,6-dione,
2,7-diphenyl-4H,9H-benzo[1,2-d:4.5-d']bis-[1,3]-oxazine-4,9-dione,
6,6'-bis(2-methyl-4H,3,1-benzoxazin-4-one),
6,6'-bis(2-ethyl-4H,3,1-benzoxazin-4-one),
6,6'-bis(2-phenyl-4H,3,1-benzoxazin-4-one),
6,6'-methylenebis(2-methyl-4H,3,1-benzoxazin-4-one),
6,6'-methylenebis(2-phenyl-4H,3,1-benzoxazin-4-one,
6,6'-ethylenebis(2-methyl-4H,3,1-benzoxazin-4-one),
6,6'-ethylenebis(2-phenyl-4H,3,1-benzoxazin-4-one),
6,6'-butylenebis(2-methyl-4H,3,1-benzoxazin-4-one),
6,6'-butylenebis(2-phenyl-4H,3,1-benzoxazin-4-one),
6,6'-oxybis(2-methyl-4H,3,1-benzoxazin-4-one),
6,6'-oxybis(2-phenyl-4H,3,1-benzoxazin-4-one),
6,6'-sulfonylbis(2-methyl-4H,3,1-benzoxazin-4-one),
6,6'-sulfonylbis(2-phenyl-4H,3,1-benzoxazin-4-one),
6,6'-carbonylbis(2-methyl-4H,3,1-benzoxazin-4-one),
6,6'-carbonylbis(2-phenyl-4H,3,1-benzoxazin-4-one),
7,7'-methylenebis(2-methyl-4H,3,1-benzoxazin-4-one),
7,7'-methylenebis(2-phenyl-4H,3,1-benzoxazin-4-one),
7,7'-bis(2-methyl-4H,3,1-benzoxazin-4-one),
7,7'-ethylenebis(2-methyl-4H,3,1-benzoxazin-4-one),
7,7'-oxybis(2-methyl-4H,3,1-benzoxazin-4-one),
7,7'-sulfonylbis(2-methyl-4H,3,1-benzoxazin-4-one),
7,7'-carbonylbis(2-methyl-4H,3,1-benzoxazin-4-one),
6,7'-bis(2-methyl-4H,3,1-benzoxazin-4-one),
6,7'-bis(2-phenyl-4H,3,1-benzoxazin-4-one),
6,7'-methylenebis(2-methyl-4H,3,1-benzoxazin-4-one), and
6,7'-methylenebis(2-phenyl-4H,3,1-benzoxazin-4-one)

Advantageously used are the compounds of formula (I), preferably the compounds of formula (I) in which n is 2, especially preferably compounds of the following formula (I)-1

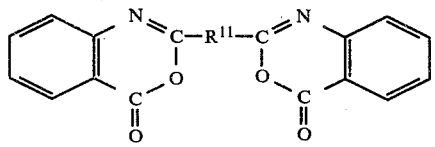
(I)-1 wherein $R^{11}$ represents a divalent aromatic hydrocarbon residue.

Among the compounds of formula (I)-1, 2,2'-p-phenylene-bis(3,1-benzoxazin-4-one), 2,2'-(4,4'-diphenylene)-bis(3,1-benzoxazin-4-one) and 2,2'-(2,6-naphthalene)bis(3,1-benzoxazin-4-one) are especially preferred.

It has been totally unknown in the past that the cyclic imino esters of formulae (I) and (II) used in this invention can be used as ultraviolet absorbers, especially as those having excellent heat resistance and oxidation resistance.

According to this invention, the above cyclic imino esters have excellent compatibility with various polymers, and give photo-stabilized polymer compositions when mixed with polymers. These polymers, therefore, may be thermoplastic resins, thermosetting resins and uncured elastomers (rubber blends). Examples of the thermoplastic resins are polyesters, polyamides, polycarbonates, polyolefins, polyethers and polysulfones. Examples of the thermosetting resins are phenolformaldehyde resins, melamine resins, polyurethan resins, urea resins, epoxy resins, and unsaturated polyester resins. Examples of the uncured elastomers are natural rubber and synthetic rubbers.

The above polymers are known per se, and well known to those skilled in the art.

The polyesters may be aromatic polyesters, such as polyethylene terephthalate, polytetramethylene terephthalate and polyethylene 2,6-naphthalate, derived from an acid component composed mainly of terephthalic acid, isophthalic acid or naphthalenedicarboxylic acid and a glycol component composed mainly of ethylene glycol or tetramethylene glycol.

There can also be cited wholly aromatic polyesters derived from the same dicarboxylic acids as above as an acid component and hydroquinone, resorcinol or 2,2-p-hydroxyphenyl propane as a main glycol component and as necessary p-hydroxybenzoic acid as an additional component (for example, a copolymer of isophthalic acid/hydroquinone/2,2-p-hydroxyphenyl propane, a copolymer of terephthalic acid/isophthalic acid/2,2-hydroxyphenyl propane, or a copolymer of isophthalic acid/hydroquinone/p-hydroxybenzoic acid), and polyester elastomers derived from terephthalic acid as a main acid component, ethylene glycol or tetramethylene glycol as a low-molecular-weight glycol component, and poly(oxytetramethylene)glycol (preferably having an average molecular weight of 500 to 5,000, more preferably 600 to 4,000) as a high-molecular-weight glycol component.

These polyesters may have copolymerized therewith a trifunctional or higher compound in such amounts that the resulting polyesters remain substantially linear, and film- or fiber-forming (usually not more than about 0.5 mole%).

Preferred as the polycarbonate are aromatic polycarbonates produced by the reaction of aromatic dihydroxy compounds typified by 2,2-bis(4-hydroxyphenyl)-propane or 1,1-bis(4-hydroxyphenyl)cyclohexane with carbonate precursors such as phosgene or diphenyl carbonate.

Examples of the polyamides include homopolyamides derived from aminocarboxylic acids or the corresponding lactams, such as nylon-6, nylon-7 and nylon-12; homopolyamides derived from aliphatic dicarboxylic acids and aliphatic diamines, such as nylon-6,6 and nylon-6,12; polyamides derived from aromatic dicarboxylic acids (such as terephthalic acid or isophthalic acid) and aliphatic diamines or aromatic diamines; and alicyclic polyamides derived from alicyclic amines such as bis-p-aminocyclohexylmethane.

The polyolefins may be polymers having ethylene, propylene, vinyl chloride, styrene, methyl methacrylate, etc. as a main structural component. Specific examples include homopolymers such as polyethylene, polypropylene, polyvinyl chloride, polystyrene and polymethyl methacrylate, and copolymers such as an acrylonitrile/butadiene/styrene copolymer (ABS resin), a methyl methacrylate/butadiene/styrene copolymer (MBS resin) and an acrylonitrile/styrene copolymer (AS resin).

Preferred as the polyethers are polymers having recurring units of the following formula

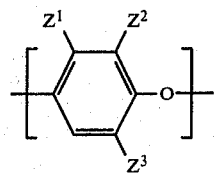

wherein $Z^1$, $Z^2$ and $Z^3$ are identical or different and each represents a hydrogen atom or an alkyl group having 1 to 4 carbon atoms, preferably a methyl group, provided that either $Z^2$ or $Z^3$ is an alkyl group having 1 to 4 carbon atoms, such as condensation products of o-cresol, 2,6-dimethylphenol, etc.

Preferred as the polysulfones are aromatic polysulfones having recurring units of the following formula

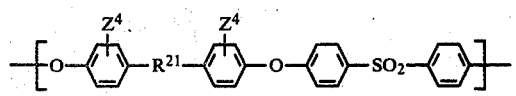

wherein $Z^4$ represents a hydrogen atom, halogen an alkyl group having 1 to 4 carbon atoms, or an alkoxy group having 1 to 4 carbon atoms, and $R^{21}$ represents an alkylene group having not more than 8 carbon atoms.

Preferred phenol-formaldehyde resins are those generally known as novolak resins having phenol as a main aromatic hydroxy compound component and formaldehyde as a main aldehyde component.

Preferred melamine or urea resins are those obtained by reacting melamine or urea with formaldehyde under heat under neutral or weakly alkaline conditions.

Preferred as the polyurethan resins are so-called prepolymers obtained by reacting a glycol component selected from low-molecular-weight aliphatic glycols such as butanediol, and diethylene glycol; and high-molecular-weight glycols such as polyether polyols (e.g., polyoxyethylene glycol and polyoxytetramethylene glycol) and aliphatic polyester glycols with an isocyanate component selected from aliphatic diisocyanates such as tetramethylene diisocyanate and hexamethylene diisocyanate, aromatic diisocyanate such as tolylene diisocyanate and naphthalene diisocyanate and alicyclic isocyanate such as isophorone diisocyanate.

Preferred epoxy resins are condensation products formed between polyhydric phenols such as 2,2-bis(p-hydroxyphenyl)propane and epichlorohydrin.

Preferred as the unsaturated polyester resins are so-called prepolymers obtained by condensing unsaturated dicarboxylic acids such as maleic acid, fumaric acid, maleic anhydride and itaconic acid with polyhydric alcohols such as ethylene glycol, propylene glycol and glycerol. Usually, these prepolymers are used as blends with vinyl monomers such as styrene, methyl methacrylate and diallyl phthalate.

Preferred as the uncured elastomers are unvulcanized natural rubber and unvulcanized synthetic rubbers such as polybutadiene, polyisoprene, a styrene/butadiene copolymer and polychloroprene.

The photo-stabilized polymer composition of this invention is composed of a polymer matrix of the types exemplified hereinabove and dispersed therein at least one of the cyclic imino esters of formulae (I) and (II) in the unreacted state.

The photo-stabilized polymer composition of this invention may contain the cyclic imino ester of formula (I) or (II) in an amount of preferably 0.05 to 5 parts by weight, especially prefereably 0.1 to 3 parts by weight, per 100 parts by weight of the polymer.

The composition of this invention can be produced generally by melt-mixing the polymer with a predetermined amount of the cyclic imino ester at a temperature above the melting point of the polymer, for example in a melt extrusion mixer, when the polymer is a thermoplastic polymer, or mechanically mixing them at ambient temperature when the polymer is a thermosetting resin.

The composition of this invention so produced can be obtained as an irregularly-shaped mixture or small chips, or through molding means, as molded articles. The composition of this invention obtained as an irregularly/shaped mixture or as chips can be converted to molded articles by a melt-molding method or by a molding method using a mold.

In the production of molded articles from the composition of this invention, known methods such as extrusion molding, injection molding, compression molding or vacuum press forming may be used suitably according to the thermal properties of the polymers used.

As described in the above-cited specification of U.S. Pat. No. 4,291,152, the cyclic imino esters used in this invention have the ability to react with the terminal hydroxyl groups of polyesters. In addition to this ability to react with the aliphatic hydroxyl group, the cyclic imino esters also have the ability to react with an amino group.

Accordingly, when the composition of this invention is to be produced by using a polymer having an aliphatic hydroxyl group or an amino group, such as a hydroxyl-terminated polyester or an amino-terminated polyamide, it is necessary to mix the polymer and the cyclic imino ester carefully so that the cyclic imino ester may be included substantially in the unreacted state.

Investigations of the present inventors have discovered for the first time that a polymer composition in which a substantial amount of the cyclic imino ester used has reacted with the polymer generally tends to absorb ultraviolet light at a lower wavelength and therefore permit transmission of ultraviolet light of higher wavelengths than the composition of this invention in which the cyclic imino ester is included in the substantially unreacted state. Ring-opening induced by the reaction is considered to be responsible for the difference in ultraviolet absorbing property between the reacted cyclic imino ester and the unreacted cyclic imino ester.

If a polyester or polyamide containing carboxyl groups as a major portion of its terminal groups or a polyester or polyamide whose terminal hydroxyl or amino groups are blocked with terminal blocking groups having no reactivity with the cyclic imino ester is used in producing the composition of this invention, it is not necessary, of course, to take any special care in including the cyclic imino ester in the unreacted state.

For the production of the composition of this invention by using a hydroxyl-terminated polyester or an amino-terminated polyamide, one recommendable method is to dry-mix granular or powdery particles of the polymer with a fine powder of the cyclic imino ester. When producing the composition by melt mixing, it is desirable to terminate the mixing within the shortest possible period of time and to rapidly cool the mixture.

For example, the melt-mixing of a polyester having reactive terminal hydroxyl groups is desirably completed within such a short period of time so as to satisfy the following expressions.

$$\log t \leq -0.008T + 4.8$$

$$T_m < T < 320$$

wherein t is the melt-mixing time (seconds), T is the melt-mixing temperature (°C.), and $T_m$ is the melting point (°C.) of the polyester.

When the aforesaid polymer having reactive terminal groups is not used, the composition of this invention can be easily produced by simply melt-mixing the polymer and the cyclic imino ester or mechanically mixing them at ambient temperature without the need to take any special care. Since water contained in the polymer can react with the cyclic imino ester during mixing, it is desirable to use the polymer in a state of containing as little water as possible.

Molded articles to be produced from the composition of this invention include, for example, fibers, films, sheets, plates, pipes, tubes, and various containers. Transparent or semitransparent molded articles based on amorphous resins or thin transparent or semitransparent molded articles based on crystalline resins, for example films, sheets, plates, tubes or pipes of polycarbonates, sheets or films of polyethylene terephthalate or wholly aromatic polyesters, sheets or films of polyvinyl chloride, films of polypropylene, sheets or films of polyethylene, and plates of methacrylate resins, find various applications as described hereinbelow.

According to this invention, there is also provided a method for protecting from ultraviolet light a molded article of a polymer whose deterioration by ultraviolet light is required to be retarded or prevented, which comprises applying an amount, effective for retarding or preventing said deterioration, of at least one compound selected from the cyclic imino esters of formulae (I) and (II) in the unreacted state to said molded article.

Application of the cyclic imino ester to the polymer article can be effected by incorporating the cyclic imino ester in the unreacted state in the polymer of the molded article as in the case of molded articles prepared from the composition of this invention, or by first preparing a molded article of polymer not containing the cyclic imino ester and then coating the surface of the article with the cyclic imino ester or impregnating the cyclic imino ester in the article.

Some of the known polymers mentioned hereinabove have fairly high resistance to ultraviolet light by themselves. It is no exaggeration to say, however, that almost none are free from deterioration on long-term exposure to ultraviolet light. Resistance to ultraviolet light may vary from material to material, but it may well be said that no material can be free from ultraviolet deterioration. The method of this invention, therefore, contemplates molded articles of all known polymers exemplified hereinabove as objects to be protected from deterioration under ultraviolet light. The cyclic imino esters used in the method of this invention acts effectively to retard or prevent the ultraviolet deterioration. The amount of the cyclic imino ester used may be varied depending upon the purpose of use, the environment in which the resulting article is used, etc., in other words, upon the amount of ultraviolet light irradiated. Usually, it is 0.05 to 5 parts by weight per 100 parts by weight of the polymer of the molded article.

In forming a coating containing the cyclic imino ester on the surface of the polymer article, it is usually preferred to prepare a solution containing the cyclic imino ester and a suitable polymer, and to coat or cast the solution on the surface of the polymer article. Methacrylate polymers are used preferably as the polymer for preparing such a solution. Examples of the methacrylate polymers include homopolymers of esters of methacrylic acid with aliphatic alcohols having 1 to 8 carbon atoms, such as methyl methacrylate, ethyl methacrylate, butyl methacrylate and 2-ethylhexyl methacrylate, and copolymers of such methacrylates with copolymerizable vinyl monomers other than methacrylates, such as acrylic acid, esters of acrylic acid with aliphatic alcohols having 1 to 8 carbon atoms, methacrylic acid, vinyl chloride, and acrylonitrile.

Organic solvents capable of dissolving the cyclic imino ester and the methacrylate polymer are preferably used as a solvent for the preparation of the solution. Examples of such solvents are ketones such as acetone and methyl ethyl ketone, esters such as ethyl acetate, chlorinated hydrocarbons such as tetrachloroethane and dichlorobenzene, and amides such as dimethylformamide and dimethyl acetamide. The solution may also be prepared by separately forming a solution of the cyclic imino ester and a solution of the methacrylate polymer by using the same organic solvent or different organic solvents, and then mixing the two solutions.

The solution can contain about 10 to about 30% by weight of the methacrylate polymer and about 1 to about 10% by weight, based on the methacrylate polymer, of the cyclic imino ester.

When a coating containing the cyclic imino ester is to be formed on the surface of the polymer article by the coating or casting of the solution, the amount of the cyclic imino ester is preferably adjusted to 0.05 to 1 part by weight per 100 parts by weight of the polymer of the article.

The coating of the solution can be effected by known methods such as gravure coating, reverse roll coating or spray coating. The film produced by the casting of the solution is laminated to the polymer article.

In impregnating the cyclic imino ester in the polymer article, a solution of the cyclic imino ester in such an organic solvent as exemplified above is prepared, and the polymer article is dipped in it, optionally under proper heating.

The impregnating solution may contain about 0.1 to about 5% by weight of the cyclic imino ester. Preferably, the amount of the cyclic imino ester used in this impregnating method is adjusted to 0.05 to 1 part by weight per 100 parts by weight of the molded article.

The polymer article to which the cyclic imino ester has been applied in the unreacted state has an action of shielding ultraviolet light.

Accordingly, the present invention further provides a method for protecting from ultraviolet light an object subject to deleterious effects under ultraviolet light, which comprises substantially shielding said object from ultraviolet light by means of a polymer article to which at least one compound selected from the cyclic imino esters of formulae (I) and (II) has been applied in the unreacted state.

The polymer article should have a shape suitable for protecting the object from ultraviolet light; for example, it should be in the form of a planar article such as a film, sheet or plate, or a hollow article such as a tube, pipe or container.

Preferably, the polymer article is substantially transparent or semitransparent to visible light. Articles which permit transmission of at least about 75% of incident light are regarded as being substantially transparent to visible light, and articles which permit transmission of at least about 40% but less than abut 75% of incident light are regarded as substantially semitransparent to visible light.

For example, transparent to semitransparent, preferably transparent, films or sheets, such as films or sheets of polyesters or polyvinyl chloride, are used suitably for greenhouses and pipe houses and protect vegetables, horticultural plants, etc. from ultraviolet light. They can also be suitably used as outdoor tenting materials for fish cultivating houses and swimming pool houses, cloths or cloth substitutes for sun shades and beach parasols.

According to the method of this invention, such plants as tomato, cucumber, watermelon, and melon can be protected from ultraviolet light with an effect of quickening ripening or accelerating growth.

The following examples illustrate the present invention in greater detail. All parts in these examples are by weight unless otherwise specified.

The ultraviolet absorbing ability of a compound was measured by means of a self spectrophotometer (Hitachi Model 330) using tetrachloroethane as a solvent. The concentration of the compound was adjusted to $5 \times 10^{-4}$ g/100 ml, and the length of the light path, to 1 cm.

A deterioration test on a resin article by a Sunshine Weather-Ometer was conducted in the following manner.

A Sunshine Weather-Ometer (a standard Sunshine Weather-O-meter WE-Sun-DC of Suga Testing Machine Co., Ltd.) was used. The sample was subjected to light irradiation while it was rotated at a rate of one revolution per minute about a light source (Matsuda Sunshine Carbon). The sample was taken out every predetermined period of time, and its break elongation and haze were measured.

The break elongation deterioration life was the time, determined by extrapolation, at which the break elongation (absolute value) was 0%.

The haze was measured in accordance with JIS-K 6714 by means of an integral sphere-type BTR meter.

EXAMPLES 1 TO 18

A 300 ml. flask equipped with a reflux condenser and a stirrer was charged with 16.3 g of isatoic anhydride and 150 ml of pyridine. They were stirred at about 50° C. to dissolve isatoic anhydride in pyridine. Then, 18.6 g of p-nitrobenzoylchloride was added in several portions over the course of about 10 minutes, and after the addition, the mixture was heated under reflux for 3 hours. The reaction mixture was cooled to 0° C. The precipitated crystals were separated by filtration, washed well with water, and dried at 120° C. for 4 hours by a hot air dryer. The resulting crystals were recrystallized from toluene to give 21 g of 2-p-nitrophenyl-3,1-benzoxazin-4-one.

In a manner similar to the above, the following compounds were prepared.
2-Methyl-3,1-benzoxazin-4-one,
2-phenyl-3,1-benzoxazin-4-one,
2-m-nitrophenyl-3,1-benzoxazin-4-one,
2-o-methoxyphenyl-3,1-benzoxazin-4-one,
2-p-methoxyphenyl-3,1-benzoxazin-4-one,
2-p-benzoylphenyl-3,1-benzoxazin-4-one,
2-α-naphthyl-3,1-benzoxazin-4-one,
2-β-naphthyl-3,1-benzoxazin-4-one,
2-p-phthalimidephenyl-3,1-benzoxazin-4-one,

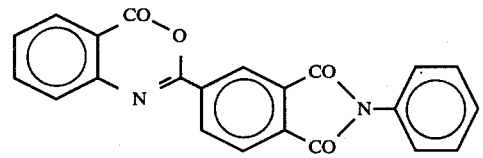

2,2'-bis(3,1-benzoxazin-4-one),
2,2'-p-phenylenebis(3,1-benzoxazin-4-one),
2,2'-m-phenylenebis(3,1-benzoxazin-4-one),
2,2'-(4,4'-diphenylene)bis(3,1-benzoxazin-4-one),
2,2'-(2,6-naphthalene)bis(3,1-benzoxazin-4-one),
N-p-(3,1-benzoxazin-4-on-2-yl)phenyl, 4-(3,1-benzoxazin-4-on-2-yl)phthalimide, and
1,3,5-tri(3,1-benzoxazin-4-on-2-yl)benzene.

The ultraviolet absorbing characteristics of these compounds are shown in Table 1.

TABLE 1

| Example | Compound | $\lambda_{max}$ (nm) | $(E_{1cm}^{1\%})$ | $\lambda s$ (nm) |
|---|---|---|---|---|
| 1 | (structure with NO2) | 328 | (770) | 400 |
| 2 | (structure with CH3) | 304 | (240) | 330 |

TABLE 1-continued

| Example | Compound | $\lambda_{max}$ (nm) | $(E_{1cm}^{1\%})$ | $\lambda s$ (nm) |
|---|---|---|---|---|
| 3 | (structure) | 322 | (500) | 355 |
| 4 | (structure with NO₂) | 328 | (460) | 370 |
| 5 | (structure with OCH₃) | 328 | (400) | 370 |
| 6 | (structure with OCH₃) | 333 | (840) | 380 |
| 7 | (structure with CO-phenyl) | 322 | (820) | 380 |
| 8 | (naphthalene structure) | 335 | (860) | 380 |
| 9 | (naphthalene structure) | 333 | (600) | 385 |
| 10 | (phthalimide-phenyl structure) | 330 | (350) | 390 |
| 11 | (phthalimide structure) | 328 | (600) | 370 |

TABLE 1-continued

| Example | Compound | λmax (nm) | (E₁cm^{1%}) | λs (nm) |
|---|---|---|---|---|
| 12 | | 337 | (820) | 370 |
| 13 | | 350 | (1100) | 385 |
| 14 | | 325 | (770) | 360 |
| 15 | | 348 | (1300) | 395 |
| 16 | | 354 | (1070) | 400 |
| 17 | | 330 | (730) | 400 |

TABLE 1-continued

| Example | Compound | $\lambda_{max}$ (nm) | $(E_{1cm}^{1\%})$ | $\lambda s$ (nm) |
|---|---|---|---|---|
| 18 | [structure] | 317 | (730) | 360 |

In Table 1, λs denotes a wavelength at which absorption begins.

It is seen from Table 1 that the ultraviolet absorbers of this invention begin to absorb ultraviolet light in a near ultraviolet region, and have a $\lambda_{max}$ value in the region of 300 to 400 nm.

EXAMPLES 19 TO 21

The same compounds as in Examples 13, 15 and 16 were subjected to DTA-TG thermal analyses in a stream of nitrogen at a temperature raising rate of 8° C./min. to determine their heat loss initiating temperatures and melting points. The results are shown in Table 2.

TABLE 2

| Example | Cyclic imino ester | Heat loss initiating temperature (°C.) | Melting point (°C.) |
|---|---|---|---|
| 19 | 2,2'-p-phenylenebis-(3,1-benzoxazin-4-one) | 315 | 320 |
| 20 | 2,2'-p,p'-diphenylenebis-(3,1-benzoxazin-4-one) | 368 | 380 |
| 21 | 2,2'-(2,6-naphthylene)-bis(3,1-benzoxazin-4-one) | 412 | 434 |

The results in Table 2 show that the cyclic imino esters used in this invention have a high melting point and remain stable without undergoing a weight loss at temperatures of up to the vicinity of their melting points.

The compound of Example 19 was prepared as follows:

Anthranillic acid (14.0 parts) and 11.7 parts of sodium carbonate were dissolved in 250 parts of water. With stirring, a solution of 10.1 parts of terephthaloyl dichloride in 60 parts of acetone was added dropwise at 20° to 30° C. to the aqueous solution. After the addition, the mixture was reacted at room temperature for 2 hours, and further for one hour while refluxing acetone. Concentrated hydrochloric acid was then added to acidify the reaction mixture. It was filtered and dried to give 19.1 parts of terephthaloylbisanthranillic acid. Acetic anhydride (100 parts) was added to the resulting product, and they were reacted for 2 hours while refluxing acetic anhydride. The reaction mixture was cooled, filtered and dried to give 15.5 parts of 2,2'-p-phenylenebis(3,1-benzoxazin-4-one).

By repeating the above procedure except that 4,4'-diphenyldicarboxylic acid dichloride and naphthalene-2,6-dicarboxylic acid dichloride were used instead of terephthaloyl dichloride, the compounds of Example 20 and Example 21 were obtained respectively.

EXAMPLES 22 TO 26

A 2-liter flask equipped with a reflux condenser and a stirrer was charged with 87 g of a mixture of 2,5-diaminoterephthalic acid and 4,6-diaminoisophthalic acid [J. Polym. Sci., 60, Issue 169, 60 (1962)] and 1.5 liters of acetic anhydride. With stirring, the mixture was heated under reflux for 1 hour. The reaction mixture was cooled with ice. The precipitated crystals were separated by filtration, and recrystallized from o-dichlorobenzene to give 58 g of a mixture of 2,8-dimethyl-4H,6H-benzo[1,2-d:5,4-d'] bis[1,3]-oxazine-4,6-dione and 2,7-dimethyl-4H,9H-benzo[1,2-d:4,5-d']bis-[1,3]-oxazine-4,9-dione.

In the same way as above, 6,6'-bis(2-methyl-4H,3,1-benzoxazin-4-one), 6,6'-methylenebis(2-methyl-4H,3,1-benzoxazin-4-one), and 6,6'-carbonylbis(2-methyl-4H,3,1-benzoxazin-4-one) were prepared by using the corresponding diaminodicarboxylic acids.

6,6'-Methylenebis(2-phenyl-4H,3,1-benzoxazin-4-one) was prepared by reacting 3,3'-dicarboxy-4,4'-diaminophenylmethane with benzoyl chloride in pyridine.

The ultraviolet light absorbing characteristics of these compounds are summarized in Table 3.

TABLE 3

| Example | Compound | $\lambda_{max}$ (nm) | $(E_{1cm}^{1\%})$ | $\lambda s$ (nm) |
|---|---|---|---|---|
| 22 | [structure] + | 358 | (120) | 390 |

TABLE 3-continued

| Example | Compound | $\lambda_{max}$ (nm) | $(E_{1cm}^{1\%})$ | $\lambda_s$ (nm) |
|---|---|---|---|---|
| 23 | [structure] | 324 | (170) | 340 |
| 24 | [structure] | 326 | (560) | 355 |
| 25 | [structure] | 332 | (430) | 360 |
| 26 | [structure] | 322 | (270) | 380 |

EXAMPLE 27

One hundred parts of polyethylene terephthalate chips having an intrinsic viscosity, measured in o-chlorophenol at 35° C., of 0.64 and 1.0 part of 2,2'-p-phenylenebis(3,1-benzoxazin-4-one) were dry-blended. The blend was melt-extruded at 280° C. through a T-die of a twin-screw extruder with an average residence time of about 5 minutes. The extrudate was quenched on a cooling drum at about 10° C. to form an amorphous film having a thickness of about 800 microns. At this time, no fuming owing to sublimation occurred. The resulting film was biaxially stretched simultaneously at a stretch ratio of 3.5 and a temperature of 80° C. in each direction, and heat set at 180° C. for 2 minutes in a hot air dryer. The stretched film completely absorbed ultraviolet light having a wavelength of not more than 385 nm.

EXAMPLES 28 TO 36 AND COMPARATIVE EXAMPLES 1 AND 2

One hundred parts of polyethylene terephthalate chips having an intrinsic viscosity of 0.65 were dry-blended with 1.0 part of each of the compounds shown in Table 4. The blend was dried, and melt-extruded at 270° C. from a T-die of a twin-screw extruder with an average residence time of about 1 minute, and then quenched on a cooling drum at about 10° C. The resulting unstretched film was stretched in one direction at 90° C. at a stretch ratio of 3.5, and then in a direction at right angles to the first direction at 100° C. at a stretch ratio of 3.5. The stretched film was heat-treated at 200° C. for 30 seconds to give a biaxially oriented film having a thickness of 125 microns.

For comparison, a polyethylene terephthalate film containing 1.0 part of 2,4-dihydroxybenzophenone (Comparative Example 1) and a polyethylene terephthalate film not containing any ultraviolet absorber (Comparative Example 2) were used. These comparative films were prepared under the same conditions as above.

The state of film extrusion and the intrinsic viscosities and light-resistant characteristics of the resulting films were evaluated, and the results are shown in Table 4.

TABLE 4

| | | | | Properties of the film | |
|---|---|---|---|---|---|
| | | | | Deterioration test by a Sunshine Weather-Ometer | |
| Example | Ultraviolet absorber | State of extrusion | [η] | Break elongation deterioration life (hours) | Haze deterioration time (hours) |
| 28 | 2,2'-bis(3,1-benzoxazin-4-one) | Good | 0.65 | 14000 | 5000 |
| 29 | 2,2'-p-phenylenebis-(3,1-benzoxazin-4-one) | Good | 0.65 | 14500 | 7000 |

TABLE 4-continued

| Example | Ultraviolet absorber | State of extrusion | [η] | Properties of the film — Deterioration test by a Sunshine Weather-Ometer Break elongation deterioration life (hours) | Haze deterioration time (hours) |
|---|---|---|---|---|---|
| 30 | 2,2'-m-phenylenebis-(3,1-benzoxazin-4-one) | Good | 0.64 | 13500 | 6500 |
| 31 | 2,2'-(2,6-naphthalene)-bis(3,1-benzoxazin-4-one) | Good | 0.65 | 15000 | 7500 |
| 32 | 2,2'-(4,4'-diphenylene)-bis(3,1-benzoxazin-4-one) | Good | 0.65 | 15000 | 7500 |
| 33 | 2,8-dimethyl-4H,6H-benzo-[1,2-d:5,4-d']bis-[1,3]-oxazine-4,6-dione | Good | 0.64 | 8000 | 4000 |
| 34 | 6,6'-methylenebis(2-phenyl-4H,3,1-benzoxazin-4-one) | Good | 0.63 | 9000 | 4800 |
| 35 | 2-p-nitrophenyl-3,1-benzoxazin-4-one | Good | 0.62 | 7500 | 4000 |
| 36 | 2-naphthyl-3,1-benzoxazin-4-one | Good | 0.62 | 6000 | 3500 |
| Comp. Ex. 1 | 2,4-dihydroxybenzophenone | Much fuming | 0.52 | 2000 | 1500 |
| Comp. Ex. 2 | None | Good | 0.62 | 800 | 700 |

It is seen from the results given in Table 4 that the films of the invention containing the cyclic imino esters showed greater ease of extrusion (lesser volatility of the additive) and had higher weatherability both in mechanical property (break elongation) and light tranmission (haze) than the film of Comparative Example 1 containing the ordinary ultraviolet absorber.

EXAMPLES 37 TO 39 AND COMPARATIVE EXAMPLE 3

One hundred parts of polycarbonate (having a number average molecular weight of about 25,000) derived from 2,2-bis(4-hydroxyphenyl)propane was dry-blended with 0.5 part of each of the compounds shown in Table 5. The mixture was melt-extruded from a T-die to form a film having a thickness of about 400 microns. No fuming occurred during film formation. The properties of the resulting films before and after light exposure for 500 hours by a Sunshine Weather-Ometer were measured, and the results are shown in Table 5.

For comparison, a film not containing any ultraviolet absorber was tested in the same way as above, and the results are also shown in Table 5.

TABLE 5

| Example | Compound | Properties of the as-extruded film | | Properties of the film after 500-hour light exposure | |
|---|---|---|---|---|---|
| | | Break elongation (%) | Strength (kg/mm²) | Break elongation (%) | Strength (kg/mm²) |
| 37 | 2,2'-(2,6-naphthalene)bis-(3,1-benzoxazin-4-one) | 135 | 7.3 | 99 | 5.6 |
| 38 | 2,2'-p-phenylenebis-(3,1-benzoxazin-4-one) | 128 | 6.9 | 82 | 5.5 |
| 39 | [structure shown below] | 131 | 7.0 | 75 | 5.4 |
| Comp. Ex. 3 | None | 137 | 7.2 | 11 | 5.4 |

[Chemical structure for Example 39 compound]

It is seen from the results given in Table 5 that the films containing the cyclic imino esters of this invention have excellent weatherability.

EXAMPLES 40 TO 42 AND COMPARATIVE EXAMPLE 4

One hundred parts of nylon-6 chips having an intrinsic viscosity of 1.12 were dry-blended with each of the cyclic imino esters shown in Table 6 in the amounts indicated. The blend was melt-extruded by an extruder at a temperature of about 260° C. to form a sheet having a thickness of about 500 microns. No fuming was observed during sheet formation. The sheet was subjected to light resistance test for 150 hours in a weather-Ometer, and examined for yellowing. The results are shown in Table 6.

As a comparison, a film not containing the cyclic imino ester was used.

TABLE 6

| Example | Cyclic imino ester | Amount added (parts) | Yellowing |
|---|---|---|---|
| 40 | 2,2'-p-phenylenebis(3,1-benzoxazin-4-one) | 0.5 | No |
| 41 | 2,2'-p,p'-diphenylenebis-(3,1-benzoxazin-4-one) | 0.4 | No |
| 42 | 2,2'-(2,6-naphthylene)bis-(3,1-benzoxazin-4-one) | 0.4 | No |
| Comp. Ex. 4 | None | — | Yes |

EXAMPLES 43 TO 45 AND COMPARATIVE EXAMPLE 5

One hundred parts of polyvinyl chloride, 50 parts of dioctyl phthalate, 0.4 part of stearic acid, 1 part of Mark AC 143 (a Ba-Zn type stabilizer made by Adeka-Argus Co., Ltd.) and a predetermined amount of each of the cyclic imino esters shown in Table 7 were kneaded on a roll. The resulting composition was formed into a sheet having a thickness of about 1 mm. The results of a light resistance test conducted on the resulting sheet in a weather-Ometer are shown in Table 7.

TABLE 7

| Example | Cyclic imino ester | Amount (parts) | Deterioration time (hours) |
|---|---|---|---|
| 43 | 2,2'-p-phenylenebis-(3,1-benzoxazin-4-one) | 0.2 | 870 |
| 44 | 2,2'-bis(3,1-benzoxazin-4-one) | 0.2 | 720 |
| 45 | 2,2'-p,p'-diphenylenebis-(3,1-benzoxazin-4-one) | 0.15 | 690 |
| Comp. Ex. 5 | None | — | 310 |

The deterioration time is the time which elapses until the elongation of the sample decreases to 10% of the initial elongation of the sample before exposure to the weather-Ometer.

EXAMPLE 46 AND COMPARATIVE EXAMPLE 6

Maleic anhydride (78 parts), 178 parts of phthalic anhydride and 167 parts of propylene glycol were gradually heated to 150° to 160° C. in a stream of nitrogen, and maintained at this temperature for 1 hour. The reaction temperature was raised gradually to about 210° C. over the course of about 1 hour. The reaction mixture was then cooled to 140° C., and 0.06 part of hydroquinone was added. Styrene was added so as to provide a styrene content of 37% by weight and well mixed to give 550 parts of an unsaturated polyester resin. Twenty parts of the unsaturated polyester was well mixed with 0.4 part of benzoyl peroxide, 0.1 part of dimethylaniline, and 0.2 part of 2,2'-p-phenylenebis(3,1-benzoxazin-4-one) at ambient temperature. The resulting resin solution was coated on both surfaces of glass fiber cloths to obtain prepregs. Three such prepregs were stacked, press-bonded and cured at 70° C. to give an FRP plate. The FRP plate was subjected to a light resistance test in a weather-Ometer for 300 hours. No yellowing was observed.

As a comparison, an FRP plate was prepared in the same way as above without adding 2,2'-p-phenylenebis(3,1-benzoxazin-4-one). It underwent yellowing by the same light resistance test as above.

EXAMPLES 47 AND 48 AND COMPARATIVE EXAMPLE 7

Dimethyl terephthalate (175 parts), 62 parts of ethylene glycol, 104 parts of neopentylene glycol, 0.18 part of calcium acetate and 0.09 part of antimony trioxide were gradually heated to 230° C. at atmospheric pressure to perform ester-interchange reaction. To the reaction mixture were added 0.18 part of trimethyl phosphate and 14.6 parts of adipic acid. The temperature was raised to 275° C., and polycondensation was carried out for 30 minutes at atmospheric pressure in a stream of nitrogen, then for 15 minutes at a pressure of about 50 mmHg and further for about 80 minutes at a pressure of less than 1 mmHg. The pressure of the reaction system was returned to atmospheric pressure by using a stream of nitrogen, and the reaction mixture was further reacted with 14.4 parts of trimellitic anhydride at 275° C. for about 20 minutes. After cooling, the resulting polymer was pulverized to form a carboxyl-terminated polyester resin.

One hundred parts of the pulverized polyester resin was dry-blended with 42.8 parts of titanium oxide, 8.5 parts of triglycidyl isocyanurate and 0.6 part of a powder of each of the cyclic imino esters shown in Table 8. The blend was further pulverized to prepare a powdery coating composition.

The coating composition was applied to a stainless steel plate, and baked at 160° C. for 2 minutes. The resulting coated film was subjected to a light resistance test in a weather-Ometer to determine changes in the gloss of its surface. The results are shown in Table 8.

TABLE 8

| | | Gloss (%) | |
|---|---|---|---|
| Example | Cyclic imino ester | Initial | After 250 hours |
| 47 | 2,2'-p-phenylenebis-(3,1-benzoxazin-4-one) | 88 | 83 |
| 48 | 2,2'-p,p'-diphenylenebis-(3,1-benzoxazin-4-one) | 85 | 81 |
| Comp. Ex. 7 | None | 89 | 51 |

The gloss was measured by using a mirror surface gloss meter with an angle of 60 degrees.

EXAMPLE 49 AND COMPARATIVE EXAMPLE 8

A pipe house having a width of 3.5 m, a length of 12 m and a height of 2.2 m was constructed by using the polyester films prepared in Example 28 and Comparative Example 2 respectively as a covering film. Two ridges (height 30 cm, width 1 m, length 12 m) of soil were built with the distance between them being adjusted to 50 cm. Fifty tomato seedling (variety "Wakashio") were planted at 50 cm intervals in the ridges on February 25. The temperature of the inside of the pipe house was controlled by a ventilating fan such that the air inside the house communicated with the outside atmosphere. The state of growth of tomatoes (the average of 50 tomatoes) and the amount of tomatoes harvested per plant up to the end of May were examined, and the results are shown in Tables 9 and 10.

The results show that the growth of tomato was accelerated by the ultraviolet light shielding action of the ultraviolet absorber of this invention.

TABLE 9

| | | March 18 | | | April 11 | | | May 5 | | |
|---|---|---|---|---|---|---|---|---|---|---|
| Film used | | Height (cm) | Number of leaves | leaf length (cm) | Height (cm) | Number of leaves | leaf length (cm) | Height (cm) | Number of leaves | Leaf length (cm) |
| Example 49 | Example 28 | 100.6 | 17.9 | 36.5 | 136.2 | 24.7 | 40.9 | 182.1 | 31.3 | 42.7 |
| Comparative Example 8 | Comparative Example 2 | 91.3 | 14.8 | 35.0 | 125.8 | 22.5 | 39.5 | 171.5 | 28.2 | 41.0 |

TABLE 10

| | | | Weight of one tomato fruit | | |
|---|---|---|---|---|---|
| Film used | | | at least 170 g | less than 170 g but at least 120 g | less than 120 g |
| Example 49 | Example 28 | Number weight (g) (*) | 7.5 1534 | 3.7 580 | 0.4 37 |
| Comparative Example 8 | Comparative Example 2 | Number Weight (g) (*) | 5.8 1184 | 4.5 651 | 1.4 152 |

(*): The weight of tomatoes harvested per plant up to May 27.

What we claim is:
1. A photo-stabilized polymer composition comprising a polymer and as an ultraviolet absorber, at least one compound selected from the group consisting of cyclic imino esters represented by the following formula (I)

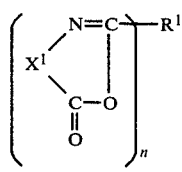 (I)

wherein $X^1$ represents 1,2-phenylene, 1,2-naphthylene, 2,3-naphthylene, a group represented by the formula (a)

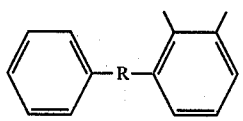 (a)

wherein R is —O—, —CO—, —S—, —SO$_2$—, —CH$_2$—, ⁺CH$_2$⁺$_2$ or —C(CH$_3$)$_2$—, or a group represented by the formula (b)

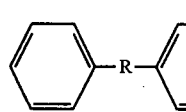 (b)

wherein R is as defined above,
n is 1, 2 or 3,
$R^1$ represents a hydrocarbon residue having a valence of n, or
when n is 1, $R^1$ further represents a residue selected from the group consisting of a group represented by the formula (c)

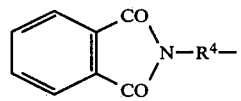 (c)

wherein $R^4$ represents an alkylene of 2 to 10 carbon atoms, phenylene or naphthylene,
a group of the formula (d)

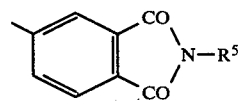 (d)

wherein $R^5$ represents an alkyl having 1 to 10 carbon atoms, a phenyl or a naphthyl,
a group of the formula (e)

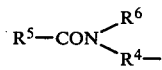 (e)

wherein $R^4$ and $R^5$ are as defined above, and $R^6$ is hydrogen atom or any one of the groups defined for $R^5$,
and a group represented by the formula (f)

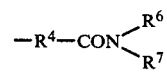 (f)

wherein $R^4$ and $R^6$ are as defined above, and $R^7$ is hydrogen atom or any one of the groups defined for $R^5$,
and when n is 2, $R^1$ further represents a direct bond, a residue selected from the group consisting of a group represented by the formula (g)

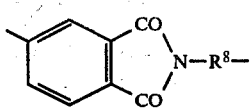
(g)

wherein $R^8$ is any one of the groups defined for $R^4$, and a group represented by the formula (h)

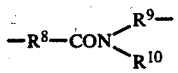
(h)

wherein $R^8$ is as defined above, $R^9$ is any one of the groups defined for $R^4$, and $R^{10}$ is any one of the groups defined for $R^6$, wherein each of the above groups defined for $X^1$ and $R^1$ may be substituted by a substituent selected from the group consisting of alkyl groups having 1 to 10 carbon atoms, aryl groups having 6 to 12 carbon atoms, cycloalkyl groups having 5 to 12 carbon atoms, aralkyl groups having 8 to 20 carbon atoms, alkoxy groups having 1 to 10 carbon atoms, carboacyl groups having 2 to 10 carbon atoms, halogen atoms and nitro groups, and cyclic imino esters represented by the following formula (II)

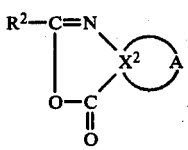
(II)

wherein A represents a group of the following formula (II)-a

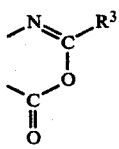
(II)-a or a group of the following formula (II)-b

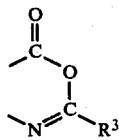
(II)-b wherein $R^2$ and $R^3$ are identical or different and each represents a monovalent hydrocarbon residue; and $X^2$ represents a tetravalent aromatic residue selected from the groups represented by the formulae:

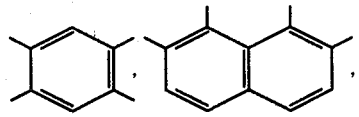

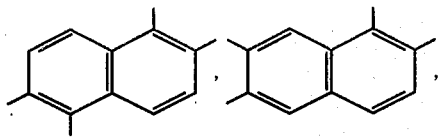

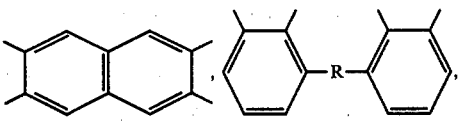

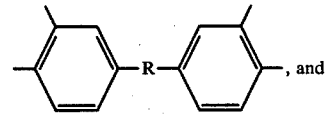, and

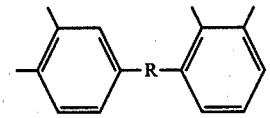

wherein R is as defined above,
in the unreacted state.

2. The composition of claim 1 wherein the ultraviolet absorber is at least one compound of formula (I), and $R^1$ is an aromatic hydrocarbon residue having a valence of n.

3. The composition of claim 2 wherein in formula (I), $R^1$ is a divalent aromatic hydrocarbon residue.

4. The composition of claim 2 wherein in formula (I), $R^1$ is a divalent aromatic hydrocarbon residue in which the two bonds extend from positions farthest from each other.

5. The composition of claim 1 wherein the amount of the cyclic imino ester is 0.05 to 5 parts by weight per 100 parts by weight of the polymer.

6. The composition of claim 1 wherein the amount of the cyclic imino ester is 0.1 to 3 parts by weight per 100 parts by weight.

7. The composition of claim 1 wherein the polymer is a thermoplastic resin, a thermosetting resin or an uncured elastomer.

8. The composition of claim 7 wherein the polymer is a thermoplastic resin which is a polyester, polyamide, polycarbonate, polyolefin, polyether or polysulfone.

9. The composition of claim 7 wherein the polymer is a thermosetting resin which is a phenol-formaldehyde resin, melamine resin, polyurethan resin, urea resin, epoxy resin or unsaturated polyester resin.

10. The composition of claim 7 wherein the polymer is an uncured elastomer which is a natural or synthetic rubber.

11. A method for protecting from ultraviolet light a molded article of a polymer whose deterioration by ultraviolet light is required to be retarded or prevented, which comprises applying to said polymer article an amount, effective for retarding or preventing said ultraviolet deterioration, of at least one compound selected from the cyclic imino esters of formulae (I) and (II) defined in claim 1 in the unreacted state.

12. The method of claim 11 wherein said polymer is a substantially linear polymer or a crosslinked polymer.

13. The method of claim 12 wherein the polymer is the substantially linear polymer which is thermoplastic.

14. The method of claim 13 wherein the substantially linear polymer is a polyester, polyamide, polycarbonate, polyolefin, polyether or polysulfone.

15. The method of claim 12 wherein the polymer is the crosslinked polymer which is a cured thermosetting resin or a cured elastomer.

16. The method of claim 15 wherein the crosslinked polymer is the thermosetting resin which is a phenol-formaldehyde resin, melamine resin, polyurethan resin, urea resin, epoxy resin or unsaturated polyester resin.

17. The method of claim 15 wherein the crosslinked polymer is a cured elastomer which is a cured natural or synthetic rubber.

18. The method of claim 11 wherein the application of the cyclic imino ester to the polymer article is effected by incorporating the cyclic imino ester in the unreacted state in the polymer of the article.

19. The method of claim 11 wherein the application of the cyclic imino ester to the polymer article is effected by forming a coating containing the cyclic imino ester on the surface of the polymer article.

20. The method of claim 11 wherein the amount of the cyclic imino ester applied is 0.05 to 5 parts by weight per 100 parts by weight of the polymer of the article.

21. A method for protecting from ultraviolet light an object subject to deleterious effects under ultraviolet light, which comprises substantially shielding said object from ultraviolet light by means of a polymer article to which at least one compound selected from the cyclic imino esters of formulae (I) and (II) defined in claim 1 has been applied in the unreacted state.

22. The method of claim 21 wherein the polymer article is substantially transparent or semitransparent to visible light.

23. The method of claim 21 or 22 wherein the polymer article is a planar or hollow article.

24. The method of claim 21 wherein the amount of the cyclic imino ester applied is 0.05 to 5 parts by weight per 100 parts by weight of the polymer of the article.

25. The method of claim 11 or 21 wherein the cyclic imino ester is a compound of the following formula (I)-1

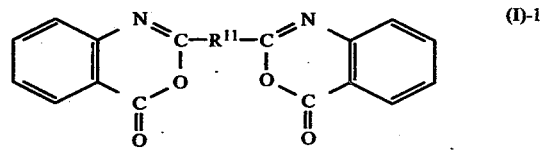

wherein $R^{11}$ represents a divalent aromatic hydrocarbon residue.

26. The method of claim 25 wherein in formula (I)-1, $R^{11}$ is a divalent aromatic hydrocarbon residue in which the two bands extend from positions farthest from each other.

27. The method of claim 26 wherein in formula (I)-1, $R^{11}$ is p-phenylene, p,p'-biphenylene, or 2,6-naphthylene.

28. The composition of claim 1 wherein the ultraviolet absorber is at least one cyclic imino ester of formula (II).

* * * * *

UNITED STATES PATENT AND TRADEMARK OFFICE
CERTIFICATE OF CORRECTION

PATENT NO. : 4,446,262
DATED : May 1, 1984
INVENTOR(S) : Nobuya Okumura, et al.

It is certified that error appears in the above—identified patent and that said Letters Patent is hereby corrected as shown below:

Column 32, line 25, delete "bands" and insert -- bonds

Signed and Sealed this

Twenty-eighth Day of August 1984

[SEAL]

Attest:

GERALD J. MOSSINGHOFF

Attesting Officer

Commissioner of Patents and Trademarks